July 29, 1941.　　　T. W. POOR ET AL　　　2,250,964
TRACTOR JACK
Filed Aug. 22, 1940　　　2 Sheets-Sheet 1

INVENTORS.
Tom W. Poor
John E. Kisinger
Herman T. Kisinger
BY
ATTORNEY.

July 29, 1941.  T. W. POOR ET AL  2,250,964
TRACTOR JACK
Filed Aug. 22, 1940  2 Sheets-Sheet 2

INVENTORS.
Tom W. Poor
John E. Kisinger
Herman T. Kisinger
BY
ATTORNEY.

Patented July 29, 1941

2,250,964

UNITED STATES PATENT OFFICE 2,250,964

TRACTOR JACK

Tom W. Poor, Olathe, and John E. Kisinger and Herman T. Kisinger, Stilwell, Kans.

Application August 22, 1940, Serial No. 353,648

7 Claims. (Cl. 254—86)

This invention relates to apparatus combinable with tractors having hydraulic mechanism forming a part thereof, which apparatus is designed and constructed to cooperate with said hydraulic mechanism in elevating the tractor from a supporting surface when it is desired to manipulate the wheels thereof.

In many types of tractors, the gauge of the wheels must be changed to suit certain conditions, and such shifting of the wheels may be readily accomplished through the use of a jack made to embody the broad concepts of this invention, providing the tractor has hydraulic mechanism with which this jack assembly may be associated.

One of the important aims of this invention is the provision of a jack for tractors, the nature of which permits the hydraulic mechanism of the tractor to elevate the wheels above the supporting surface by moving parts of the jack toward a vertical position—such movement occurring by unique and novel connection to the draw-bar or adjacent elements that are actuated by the hydraulic mechanism.

A yet further and important object of the instant invention is to provide a tractor jack, the parts of which are strong, durable, simple to manufacture, and capable of collapsing to a package for shipping.

Other objects of the invention, including the specific manner of quickly attaching the jack in the operative position, will appear during the course of the following specification, referring to the accompanying drawings wherein.

Figure 1:
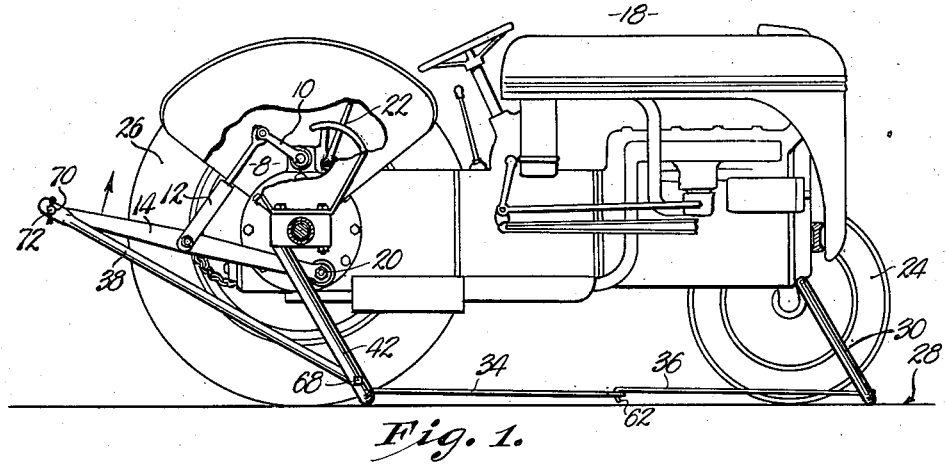
Figure 1 is a fragmentary side elevational view of a tractor having the jack made in accordance with this invention associated therewith and in a place ready to perform the lifting operation.

One commercial type of tractor embodies hydraulic mechanism, broadly indicated by the numeral 8, and which includes arms 10 and 12 that serve to join links 14 with said mechanism 8.

Draw-bar 16 of well-known type, normally has attached thereto, the implement which tractor 18 is pulling. This draw-bar 16 joins the outer ends of links 14 while the inner ends thereof are pivotally attached as at 20 to a portion of tractor 18. Hydraulic mechanism 8 is controlled from the driver's seat through the use of a control lever 22.

It is with the foregoing specifically mentioned parts of tractor 18, that the jack per se is associated.

When the gauge of either front wheels 24 or rear wheels 26 is to be altered, it is desirable to elevate tractor 18 from supporting surface 28 with as little effort as possible. The amount of time required for such work is also a factor and therefore, the jack itself is made to operate efficiently in these respects.

Figure 2:
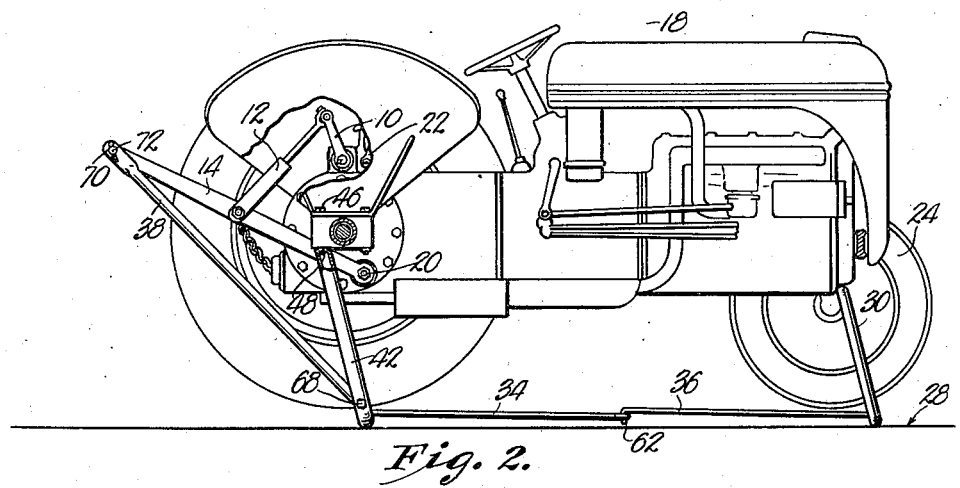
Fig. 2 is a similar view illustrating the jack moved to a place where the tractor is elevated from the supporting surface.
Figure 3:
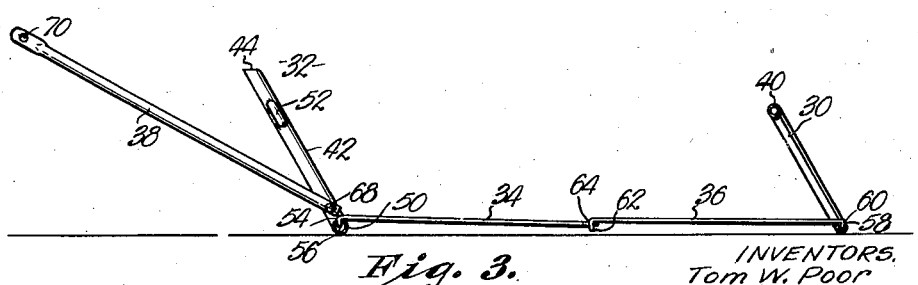
Fig. 3 is a longitudinal central sectional view through the jack per se, entirely removed from association with the tractor.
Figure 4:
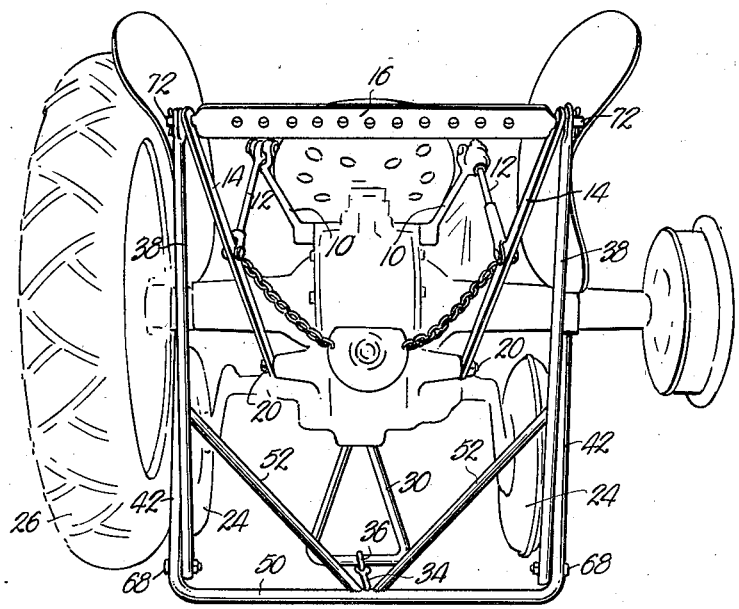
Fig. 4 is a rear elevational view of a tractor, with one wheel removed, showing the jack in place.
Figure 5:
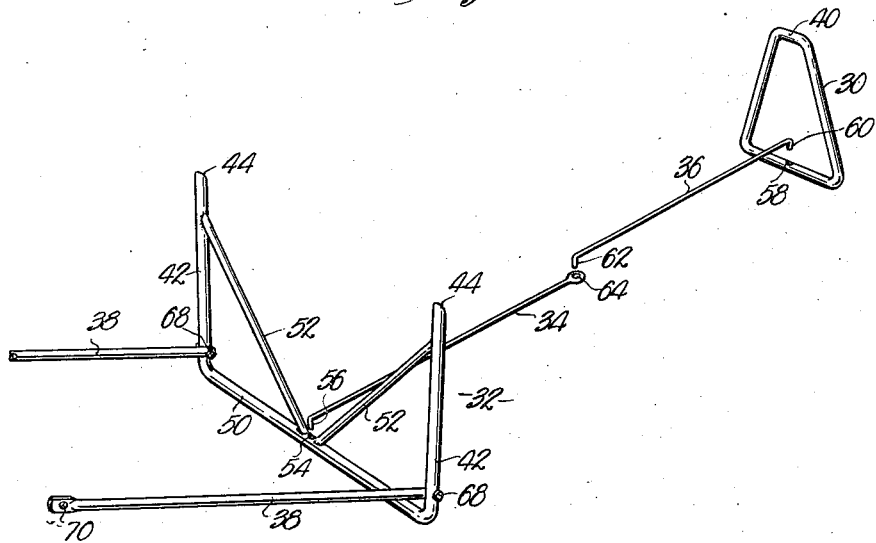
Fig. 5 is a perspective view of the tractor jack.

The apparatus embodying the preferred form of the invention comprises a forward stand 30, a rear stand 32, tie-rods 34 and 36, and connecting members 38. Stand 30 has a seat 40 which engages a part of the tractor, as shown in Figs. 1 and 2, while the lower portion thereof is wide enough to present a sufficient area to the supporting surface 28 to preclude slipping and swinging.

Rear stand 32 is an inverted U-shaped member, the legs 42 whereof have sockets 44 at the upper free ends thereof to engage the exposed portion of fender bracket bolt 46 and the nut 48 which is threaded thereon.

Bight 50 of stand 32 rests upon surface 28 while braces 52 strengthen the stand and overcome any tendency of legs 42 to move laterally.

A cavity 54 formed in bight 50 of stand 32 receives the laterally extending fingers 56 of tie-rod 34 while a similar socket 58 receives finger 60 of tie-rod 36. This last mentioned tie-rod 36 has a finger 62 at one end thereof close to eye 64 formed on tie-rod 34 so that the entire rod comprising sections 34 and 46, may extend from one stand to the other when the jack is assembled.

A pair of connecting members 38 are pivotally joined as at 68 to legs 42 of rear stand 32. Openings 70 formed in the free ends of connecting members 38 receive the reduced ends 72 of draw-bar 16 when the jack is associated with tractor 18. Arms 10 and 12 are arranged to act upon links 14 intermediate the ends thereof.

The length of stands 30 and 32 respectively, is greater than the distance between the supporting surface and that portion of the tractor which each stand engages. When stands 30 and 32 are first positioned beneath tractor 18, the degree of angularity from the vertical is greater than the angularity thereof when the tractor 18 has been lifted.

As the hydraulic mechanism 8 pulls the outer free ends of links 14 in the direction of the arrow shown in Fig. 1, stands 30 and 32 will be straightened or moved toward a true vertical position, thereby elevating the entire tractor so that wheels 24 and 26 thereof are out of engagement with the supporting surface 28.

Rear stand 32 is relatively wide with respect to stand 30 to insure stability and to preclude any tendency on the part of tractor 18 to tip. Moving the jack to other parts of the tractor 18 than those shown to be engaged in Figs. 1 and 2, will result in raising the entire tractor to different positions above surface 28 and the user may select the degree of elevation desired by setting the jack parts as the type of work requires.

Stands 30 and 32 are constructed of tubular material as are connecting members 38. Strength and rigidity is thereby assured and the weight of the apparatus maintained at a minimum.

If only the rear end of tractor 18 is to be raised, the quickly detachable tie-rods 34 and 36 may be removed from their operative positions by lifting fingers 56 or 62 from the engaged relation with cavity 54 or eye 64 respectively.

Obviously tractor jacks having physical characteristics other than those shown in the accompanying drawings and described in the foregoing specification, may be made to embody the concepts of this invention without departing from the spirit thereof and scope of the appended claims.

Having thus described the invention, what is claimed as new and desired to be secured by Letters Patent is:

1. A jack for tractors, having a draw-bar and hydraulic mechanism for moving the same, comprising a plurality of stands; and means joining the stands to said hydraulic mechanism.

2. A jack for tractors having a draw-bar and hydraulic mechanism for moving the same, comprising a plurality of stands; tie-rods interconnecting the stands; and means for joining at least one of the stands to said hydraulic mechanism.

3. A jack for tractors having a draw-bar and hydraulic mechanism for moving the same, comprising a plurality of stands arranged at an angle to the vertical beneath the tractor; tie-rods interconnecting the lowermost portions of said stands as the upper ends are in engagement with the tractor; and members connecting at least one of the stands with the said hydraulic mechanism for moving the stands toward a vertical position and thereby lifting the tractor wheels from the supporting surface.

4. A jack for tractors having hydraulic mechanism comprising a plurality of stands, each having a length greater than the distance between the supporting surface and that portion of the tractor which each stand engages; and a member connecting at least one of the stands and the hydraulic mechanism whereby the stands are moved toward the vertical position to elevate the tractor wheels from the supporting surface.

5. A jack for tractors having a draw-bar and hydraulic mechanism for moving the same, comprising a plurality of stands each having a length greater than the distance between the supporting surface and that portion of the tractor which each stand respectively engages whereby the stands are inclined from the vertical when in the operative position; a tie-rod interconnecting the lowermost portions of said stands as the upper ends are in engagement with the tractor; and members connecting one of the stands with the said hydraulic mechanism for moving the stands toward a vertical position and thereby lifting the tractor from the supporting surface.

6. A jack for tractors having a draw-bar and hydraulic mechanism for moving the same, comprising a plurality of stands arranged at an angle to the vertical beneath the tractor; tie-rods interconnecting the lowermost portions of said stands as the upper ends are in engagement with the tractor; and members connecting at least one of the stands with the said hydraulic mechanism for moving the stands toward a vertical position and thereby lifting the tractor wheels from the supporting surface, one of said stands having means for embracing a part of the tractor to preclude lateral movement thereof.

7. A jack for tractors having a draw-bar and hydraulic mechanism for moving the same, comprising a plurality of stands arranged at an angle to the vertical beneath the tractor; tie-rods interconnecting the lowermost portions of said stands as the upper ends are in engagement with the tractor; and members connecting at least one of the stands with the said hydraulic mechanism for moving the stands toward a vertical position and thereby lifting the tractor wheels from the supporting surface, said tie-rods having parts for releasably engaging the stands and elements for releasably joining together the same.

TOM W. POOR.
JOHN E. KISINGER.
HERMAN T. KISINGER.